(12) United States Patent
Evans et al.

(10) Patent No.: US 11,614,184 B2
(45) Date of Patent: *Mar. 28, 2023

(54) METHOD FOR MAKING A THREADED CONNECTION FOR PIPES, SUCH AS OIL AND GAS PIPES

(71) Applicant: ARCELORMITTAL TUBULAR PRODUCTS LUXEMBOURG S.A., Luxembourg (LU)

(72) Inventors: Merle E. Evans, Houston, TX (US); Jeroen Stijn Juliaan Van Wittenberghe, Zelzate (BE)

(73) Assignee: ARCELORMITTAL TUBULAR PRODUCTS LUXEMBOURG S.A., Luxembourg (LU)

( * ) Notice: Subject to any disclaimer, the term of this patent is extended or adjusted under 35 U.S.C. 154(b) by 304 days.

This patent is subject to a terminal disclaimer.

(21) Appl. No.: 16/807,535

(22) Filed: Mar. 3, 2020

(65) Prior Publication Data

US 2020/0200303 A1 Jun. 25, 2020

Related U.S. Application Data

(60) Continuation of application No. 15/974,993, filed on May 9, 2018, now Pat. No. 10,612,700, which is a
(Continued)

(51) Int. Cl.
*F16L 15/00* (2006.01)
*E21B 17/042* (2006.01)
*E21B 17/08* (2006.01)

(52) U.S. Cl.
CPC ............ *F16L 15/00* (2013.01); *E21B 17/042* (2013.01); *E21B 17/08* (2013.01); *F16L 15/004* (2013.01); *F16L 2201/40* (2013.01)

(58) Field of Classification Search
CPC ....... F16L 15/00; F16L 15/004; F16L 15/001; E21B 17/042; E21B 17/08
See application file for complete search history.

(56) References Cited

U.S. PATENT DOCUMENTS

| 3,224,799 A | 12/1965 | Blose et al. |
| 3,870,351 A | 3/1975 | Matsuki et al. |

(Continued)

FOREIGN PATENT DOCUMENTS

| CA | 2701417 A1 * | 4/2009 | ........... E21B 17/042 |
| CN | 2351541 Y | 12/1999 | |

(Continued)

*Primary Examiner* — Zachary T Dragicevich
*Assistant Examiner* — James A Linford
(74) *Attorney, Agent, or Firm* — Davidson, Davidson & Kappel, LLC

(57) ABSTRACT

A threaded connection includes a first tube having a pin, the pin having pin threads, a circumferential concave outer pin surface, and a pin torque shoulder at a free end, the concave outer pin surface including a pin seal surface and a continuous extension from the pin seal surface to the pin torque shoulder. A second tube has a box, the box has box threads for interacting with the pin threads, a circumferential inner box surface and a box torque shoulder. The inner box surface has a radially inwardly extending box seal surface, the pin seal surface contacts the box seal surface to define a seal. The seal is spaced from the free end when the pin and box torque shoulders contact, the continuous extension continuing from the seal to the pin torque shoulder. A method for making-up a threaded connection is also provided.

20 Claims, 4 Drawing Sheets

Related U.S. Application Data division of application No. 14/626,297, filed on Feb. 19, 2015, now Pat. No. 10,006,569.

(56) References Cited

U.S. PATENT DOCUMENTS

| | | | |
|---|---|---|---|
| 4,377,302 A | 3/1983 | Kohyama et al. |
| 4,384,737 A | 5/1983 | Reusser |
| 4,433,862 A | 2/1984 | Raulins et al. |
| 4,537,429 A | 8/1985 | Landriault et al. |
| 4,550,937 A | 11/1985 | Duret |
| 4,623,173 A | 11/1986 | Handa et al. |
| 4,624,488 A | 11/1986 | Furgerson et al. |
| 4,629,224 A | 12/1986 | Landriault et al. |
| 4,732,416 A | 3/1988 | Dearden et al. |
| 4,795,200 A | 1/1989 | Tung et al. |
| 5,137,310 A | 8/1992 | Noel et al. |
| 5,769,466 A | 6/1998 | Noel et al. |
| 6,045,165 A | 4/2000 | Sugino et al. |
| 6,047,997 A | 4/2000 | Huey |
| 6,206,436 B1 | 3/2001 | Mallis et al. |
| 6,311,790 B1 | 11/2001 | Beckwith et al. |
| 6,485,063 B1 | 11/2002 | Huey et al. |
| 6,511,102 B2 | 1/2003 | Krug et al. |
| 7,077,197 B2 | 7/2006 | Weatherford et al. |
| 7,334,821 B2 | 2/2008 | Dutilleul et al. |
| 7,690,696 B2 | 4/2010 | Mallis et al. |
| 7,699,361 B2 | 4/2010 | Verger et al. |
| 7,823,931 B2 | 11/2010 | Hamamoto et al. |
| 3,038,179 A1 | 10/2011 | Takano et al. |
| 8,287,008 B2 | 10/2012 | Charvet-Quemin et al. |
| 8,485,563 B2 | 7/2013 | Patureau et al. |
| 8,641,100 B2 | 2/2014 | Patureau et al. |
| 8,894,101 B2 * | 11/2014 | Pallini, Jr. | F16L 15/004 285/333 |
| 9,273,521 B2 | 3/2016 | Martin et al. |
| 9,388,925 B2 | 7/2016 | Juarez et al. |
| 9,470,345 B2 | 10/2016 | Yoshikawa et al. |
| 9,869,139 B2 | 1/2018 | Hou et al. |
| 10,316,995 B2 * | 6/2019 | Gillot | F16L 15/004 |
| 2002/0021006 A1 | 2/2002 | Mallis et al. |
| 2009/0152008 A1 | 6/2009 | Salins et al. |
| 2010/0283239 A1 | 11/2010 | Gillot |
| 2010/0301603 A1 * | 12/2010 | Beigneux | F16L 15/004 408/1 R |
| 2011/0025051 A1 | 2/2011 | Yamaguchi et al. |
| 2011/0241339 A1 | 10/2011 | Verger et al. |
| 2012/0133129 A1 | 5/2012 | Hignett et al. |
| 2015/0145247 A1 * | 5/2015 | Zhu | E21B 17/042 285/333 |
| 2016/0245433 A1 | 8/2016 | Merle |

FOREIGN PATENT DOCUMENTS

| | | | |
|---|---|---|---|
| CN | 1617994 A | 5/2005 |
| CN | 201121782 Y | 9/2008 |
| CN | 101595272 A | 12/2009 |
| CN | 201620767 U | 11/2010 |
| CN | 101910548 A | 12/2010 |
| DE | 4446806 C1 | 5/1996 |
| EA | 201170902 A1 | 12/2011 |
| EA | 201290969 A1 | 3/2013 |
| JP | S58193993 A | 11/1983 |
| JP | H0587275 A | 4/1993 |
| JP | H09152067 A | 6/1997 |
| JP | 2005240888 A | 9/2005 |
| JP | 2009505003 A | 2/2009 |
| JP | 2013511672 A | 4/2013 |
| RU | 42283 U1 | 11/2004 |
| RU | 2439416 C1 | 1/2012 |
| RU | 2471058 C2 | 12/2012 |
| RU | 158152 U1 | 12/2015 |
| RU | 160886 U | 4/2016 |
| UA | 1127544 C2 | 9/2000 |
| WO | WO8404352 A1 | 11/1984 |
| WO | WO-2010133299 A1 * | 11/2010 | E21B 17/042 |

* cited by examiner

METHOD FOR MAKING A THREADED CONNECTION FOR PIPES, SUCH AS OIL AND GAS PIPES

This is a Continuation of U.S. patent application Ser. No. 15/974,993, filed May 9, 2018 which is a Divisional of U.S. patent application Ser. No. 14/626,297, filed Feb. 19, 2015, both of which are hereby incorporated by reference herein.

The present invention relates to a threaded pipes and connectors for such pipes, such as used in the oil and natural gas industry. For example, a pipe can have an end with a pin that fits into a box at one end of a connector, the pipe and connector being connected by threading. The connector can have a second box for another pipe with another pin, so that the pipe and the other pipe are connected via the connector.

BACKGROUND

U.S. Pat. No. 4,623,173 describes a screw joint coupling for oil pipes. A main sealing portion is provided with a sealing portion which is axially convex at an end of a male screw, and with a sealing portion which is tapered at an inner side of a female screw, and an end point of the male screw butting an end part of a stopper formed at the inner side of the female screw.

U.S. Pat. No. 7,334,821 describes a threaded tubular connection with a male threaded element and a female threaded element. The male threaded element has male threading and a free end, with a non-threaded lip between the threading and the free end. The female threaded element has an internal tapered female threading and a non threaded portion between the female threading and a lug. The female threaded element comprises an annular axial abutment surface. After complete makeup of the male threading in the female threading, the free end bears against the annular axial abutment surface, which other bearing surfaces radially interfere and are under metal-metal contact pressure to constitute metal-metal sealing surfaces.

In the '821 patent, another axial abutment surface thus is formed on a front surface of the free end of the male threaded element, and a single lip sealing surface is disposed on the lip at an axial distance from the end of the threading. The lip comprises, between the distal axial abutment surface and the single lip sealing surface, an appendix having a peripheral surface facing the female threaded member that is distinct from the lip sealing surface.

SUMMARY OF THE INVENTION

During make-up of a connection between a threaded tube with a pin, such as a pipe, and a threaded tube with a box, such as a connector, the following sequence occurs: (1) the pin on the pipe is stabbed into the connector until thread crests touch; (2) the pin is then screwed into the box until the pin seal surface initially touches the box seal surface, to define a position is called "hand tight"; (3) the pin is further screwed into the box until an end of the pin, a so-called torque shoulder, just touches a corresponding torque shoulder on the box, to define a position called "shoulder tight", with this additional turning from the hand tight to the shoulder tight positions causing an interference fit between the pin and box seals; and (4) the pin is further tightened to create an additional torque to define a final made up position is called "power tight".

A distance between the pin and box torque shoulders when the connection is at hand tight is called "stand off", the stand off being eliminated once the shoulder tight position is reached. A large amount of stand off can be problematic: as the stand off is eliminated the seal surfaces are in contact. A high amount of turning caused by a large stand-off can cause galling of the seal surfaces, thus compromising the seals.

A distance of maximum contact stress of the pin and box at the seal further away from the end of the pin can also be desirable to improve sealing.

An object of the present invention is to provide a seal with a point of maximum contact stress well away from the end of the pin, while limiting the amount of stand off. An alternate or additional object is to provide a connection that is easy to manufacture.

The present invention provides a threaded connection comprising a first tube having a pin, the pin having pin threads, a circumferential concave outer pin surface, and a pin torque shoulder at a free end. The concave outer pin surface includes a pin seal surface and a continuous extension from the pin seal surface to the pin torque shoulder. A second tube has a box, the box having box threads, a circumferential inner box surface and a box torque shoulder, the inner box surface having a radially inwardly extending box seal surface. The pin seal surface contacts the box seal surface to define a seal, the seal being spaced from the free end when the pin and box torque shoulders contact, the continuous extension continuing from the seal to the pin torque shoulder.

The continuous concave outer pin surface thus advantageously provides a single surface along which the inner box surface can interact to form the seal, and the seal can be formed with a maximum contact stress away from the end with a small stand-off. Galling can be reduced while still providing an excellent seal. Also, the precision needed with the distinct surfaces of the prior art can be avoided, and both manufacture and make up can be simplified.

The following further features of the threaded connection may have advantages, either alone or in combination with other further features:

the pin seal surface extends radially inwardly toward the free end, while the extension curves radially outwardly at the free end;

the pin and/or box torque shoulder is V-shaped in cross-section;

the pin threads are double start threads;

the first tube is a pipe and the second tube is a connector having a second box similar to the box on a second end;

a line tangent to a box seal surface radius and the pin seal surface radius at the point of maximum contact stress at power tight make up forms an angle of 5 to 15 degrees with a longitudinal axis of the first and second tubes, and most preferably is 10 degrees; and a distance from the end of the pin (at the pin surface) to the seal maximum stress contact point preferably is in the range of 0.5-1.5 in, most preferably 1 in.

The present invention also provides a method for making-up a threaded connection having a first tube having a pin, the pin having pin threads, a circumferential concave outer pin surface, and a pin torque shoulder at a free end, the concave outer pin surface including a pin seal surface and a continuous extension from the pin seal surface to the pin torque shoulder, and a second tube having a box, the box having box threads, a circumferential inner box surface and a box torque shoulder, the inner box surface having a radially inwardly extending box seal surface. The method comprises the steps of stabbing the first tube into the second tube until the pin threads and box threads contact; screwing the first tube into the second tube via the pin threads and box threads until the outer pin surface contacts the inner box surface and the pin torque shoulder is spaced from the box torque shoulder by a standoff distance; further screwing the first tube into the second tube until the pin torque shoulder just contacts the box torque shoulder in a shoulder tight position, the pin seal surface contacting the box seal surface to define a seal, the seal being spaced from the free end in the shoulder tight position; and still further screwing the first tube into the second tube after the shoulder tight position to define a final made up position.

The following further features of the method may have advantages, either alone or in combination with other further features:

the number of turns during the further screwing step is less than 0.5, the standoff distance is between 0.02 inches and 0.25 inches;

the pin seal surface extends radially inwardly toward the free end, while the extension curves radially outwardly at the free end;

the pin and/or box torque shoulder is V-shaped in cross-section;

the pin threads are double start threads; and the first tube is a pipe and the second tube is a connector having a second box similar to the box on a second end.

BRIEF DESCRIPTION OF THE DRAWINGS

The drawings describe exemplary embodiments of the present invention.

DETAILED DESCRIPTION

Figure 1:
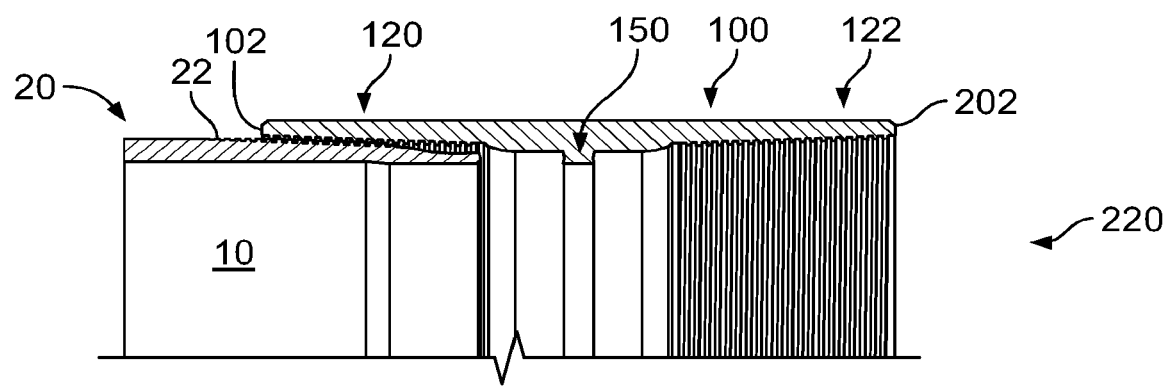
FIG. 1 shows one embodiment of the present invention, where the pin of an oil pipe is stabbed into the box of a connector.

FIG. 1 shows an oil pipe 10 and a connector 100, in a first stage, the stabbed position. Oil pipe 10 has a pin 20 with a threaded section 22, a pin seal surface 24 and a torque shoulder 26 at a free end 260. Connector 100 has two boxes 120, 220. Each box has a threaded section 122, a box seal surface 124 and a torque shoulder 126 on a radially inwardly projection 150. The connector 100 has two free ends 102 and 202.

Figure 2:
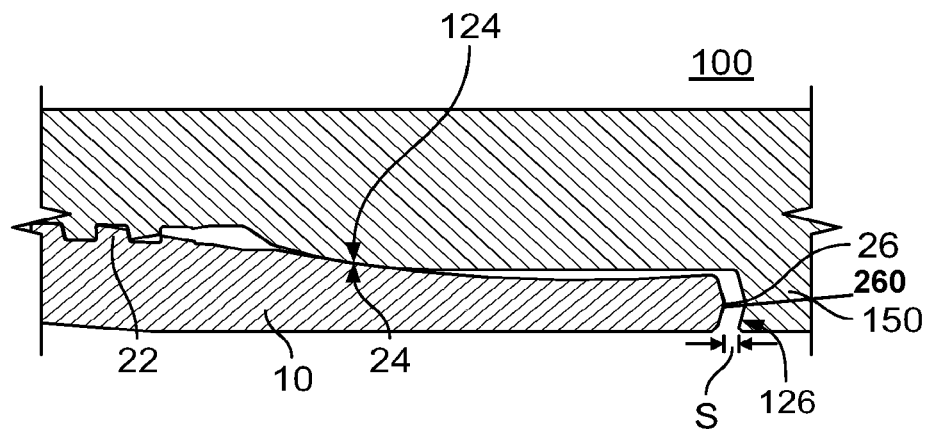
FIG. 2 shows the connection with oil pipe 10 and connector 100 in the second stage of make-up, the hand tight position.

FIG. 2 shows the connection with oil pipe 10 and connector 100 in the second stage of makeup, the hand tight position, where the pin seal surface 24 and the box seal surface 124 just begin to touch. A standoff S exists between the pin torque shoulder 26 and the box torque shoulder 126 in the hand tight position. In this embodiment, the standoff S at this point is approximately 0.060 in., although can vary widely as a result of the designed seal interference and seal angles.

Figure 3:
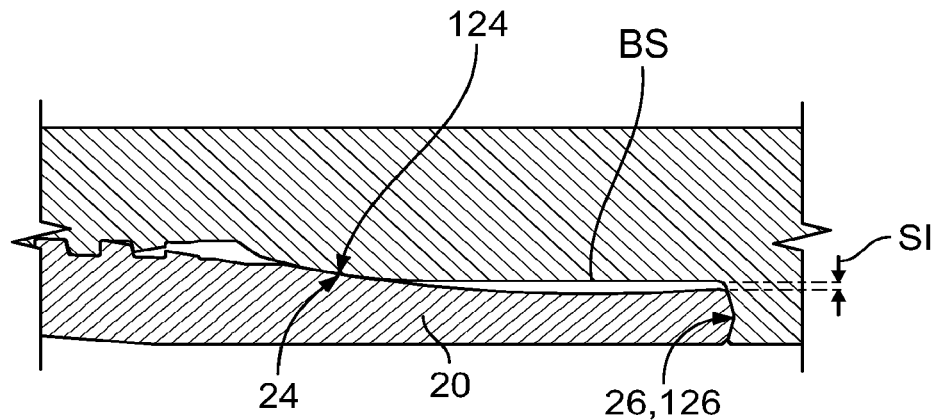
FIG. 3 shows the third stage of make-up, shoulder tight.

FIG. 3 shows the third stage of make-up, shoulder tight, when the torque shoulders 26, 126 just contact but before any force has been added to them from additional torque. The standoff S thus is eliminated, preferably in less than 0.5 turns. In the shoulder tight position the seal surfaces 24, 124 have been forced together by screwing the pin into the box until the torque shoulders 26, 126 contact. Because of the relative angles of the seal surfaces 24, 124, the surfaces have been forced radially apart by an amount of seal interference designed into the connection to cause sufficient contact pressure to form a leak tight seal. A distance S1 in the radial direction exists between the end of pin 20 and surface BS.

The fourth and final stage of makeup is power tight. During the power tight stage additional torque is applied to the torque shoulders 26, 126 but very little additional rotation occurs, about 0.01 turns in the shown embodiment. Preferably, the threads 22 are double start threads, so that the galling is reduced further. Because very little additional rotation occurs, the connection looks mostly like the shoulder tight position shown in FIG. 3.

Figure 4:
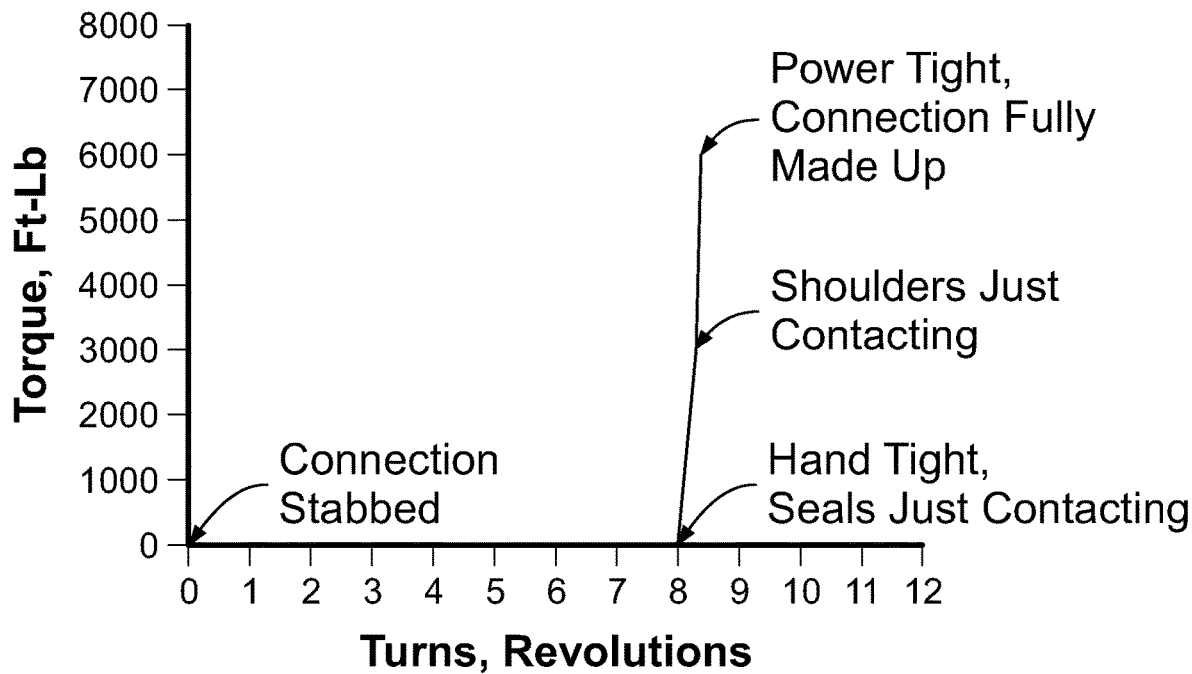
FIG. 4 is a graph that shows how the torque applied to the connection varies during the make-up of the connection.

FIG. 4 is a graph that shows how the torque applied to the connection varies during the make-up of the connection. The pin 20 has been stabbed into the box 120 as in FIG. 1 at the zero turns location. At this point, the pin 20 is merely resting in the box 120 and no turns have been applied. After the connection is stabbed, the pin 20 is screwed into the box 120. In the shown embodiment, this screwing takes about 8 turns before the seals contact. During these initial turns no torque builds up since the threads are free running during this time. At about 8 turns the seal surfaces 24, 124 contact at the hand tight position. Once the seal surfaces 24, 124 contact, torque begins to build up rapidly. The torque build up is caused by the seal surfaces 24, 124 being wedged together. The amount of torque build up is a function of the friction, the stiffnesses of the pin and box members around the seal area, the amount of thread interference, if any, and the amount of interference in the seals. The torque continues increasing at an approximately constant rate until the shoulders 26, 126 contact. Once the shoulders 26, 126 contact additional torque is applied until the pre-determined power tight make-up torque is achieved. The torque builds up extremely rapidly after the shoulders contact with very little additional rotation of the connection, with a desired final make-up torque being able to be reached in only approximately 0.01 turns. A torque gauge or program of a power tong can be used to set the final make-up torque.

Figure 5:
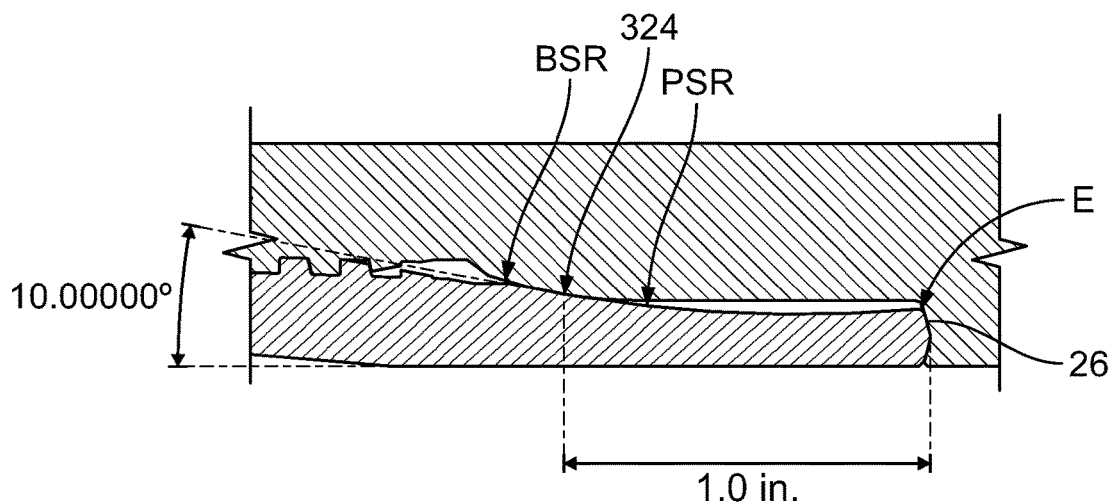
FIG. 5 shows an enlargement of the seal area of FIG. 3.

FIG. 5 shows an enlargement of the seal area of FIG. 3 with the pin seal radius PSR and box seal radius BSR shown. The box seal surface radius in this embodiment is 1.63826 in and the pin seal surface radius is 4.75 in. The angle of a line tangent to the seal surface radii at the point 324 of maximum contact stress at power tight make up is approximately 10 degrees, and may vary from 5 to 15 degrees in advantageous embodiments. The angle affects the seal during the application of axial loads and bending and also affects the resistance of the seal to galling during make-up. The length from the end E of the pin (at the pin surface) to the seal maximum stress contact point most preferably is about 1.0 in. This length preferably is in the range of from 0.5 to 1.5 inches. At lengths less than 0.5 inches, the seal contact stress begins to degrade while lengths longer than 1.5 inches have little extra effect on the seal contact.

Point 324 and point E, and the distance between them, all define the pin seal radius PSR. The size of the pin radius is defined mostly by the geometry of the end of the pin. It should also be noted that the seal contact is not a point but is distributed over a length. In the above discussion, the seal contact point is the maximum stress contact point, which for two contacting arced surfaces is located approximately in the center of the contact length.

The box seal in this design has a radius of 1.63826 in. The box seal radius is ultimately determined by the contact stress distribution that is wanted between the two seal surfaces.

The seal contact stress distribution of a connection is generally a function of the following:
the stiffness of the pin;
the stiffness of the box;
the interference between the two seal surfaces; and
the shape of the seal surfaces.

In the present invention if the pin radius is made larger or the box radius is made smaller then the contact length decreases and the peak contact stress increases, if the rest of the connection geometry remains roughly the same. While increasing the peak contact stress increases the sealing ability of the connection it also increases the chances that the seal will gall during make-up which is undesirable. Conversely, lowering the peak contact stress lowers the sealing ability of the connection but it reduces the chances of the seal galling during make-up which is desirable. Therefore a balance must be maintained in order to make a seal that will both seal and not gall during make-up. Since the pin seal is mainly determined by the geometry of the pin, the box seal radius should be designed to achieve the optimum contact stress distribution for the given pin seal radius. As the connection is designed for different wall thicknesses of pipe the box seal radius is adjusted to maintain the optimum seal design criteria.

FIG. 5 shows a small rounded area at end E of the pin. This rounded area connects the pin seal radius PSR to the torque shoulder surface 26. This area could just as easily be a chamfer or a break edge. A sharp edge is undesirable as burrs can form there and be a safety problem to personnel inspecting the pin and the burrs could break off and become trapped between the seal surfaces during makeup and compromise the seal.

Figure 6:
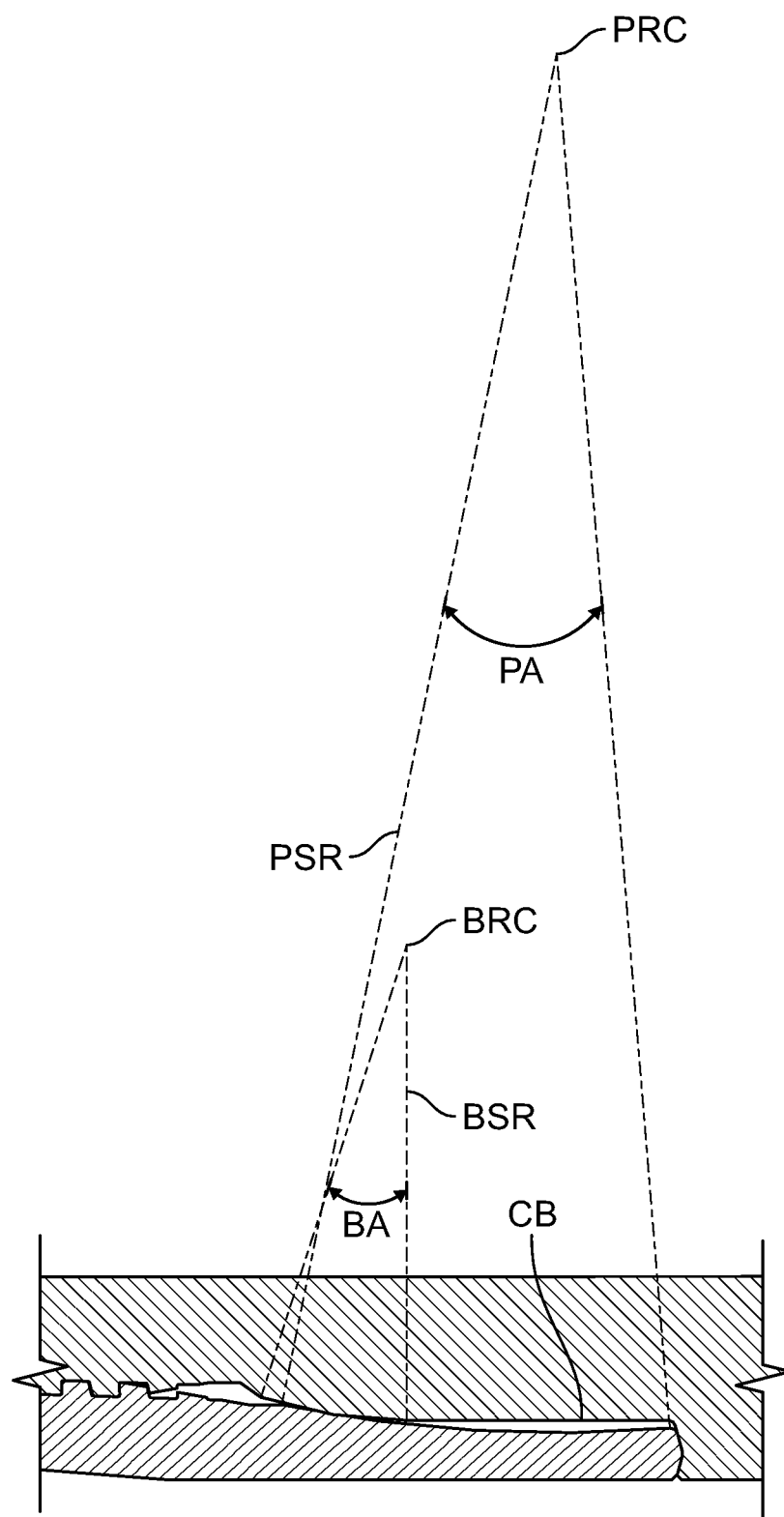
FIG. 6 shows schematically the extent of the pin and box seal radii.

FIG. 6 shows schematically the extent of the pin and box seal radii PSR and BSR. These extents can vary considerably, especially on the box without impact on the invention. The invention shows the box radius tangent to a straight counterbore CB. The box seal radius could continue up to intersect the counterbore at a sharp corner or a blend between the radius and the counterbore. In this example the angle PA the pin radius makes is 16.29 deg. and the angle BA the box makes is 17.95 deg. The locations of the radii centerpoints are not particularly important and are not correctly shown in these sketches. The schematics in FIG. 6, while fairly accurate, are for illustrative purposes only.

Figure 7:
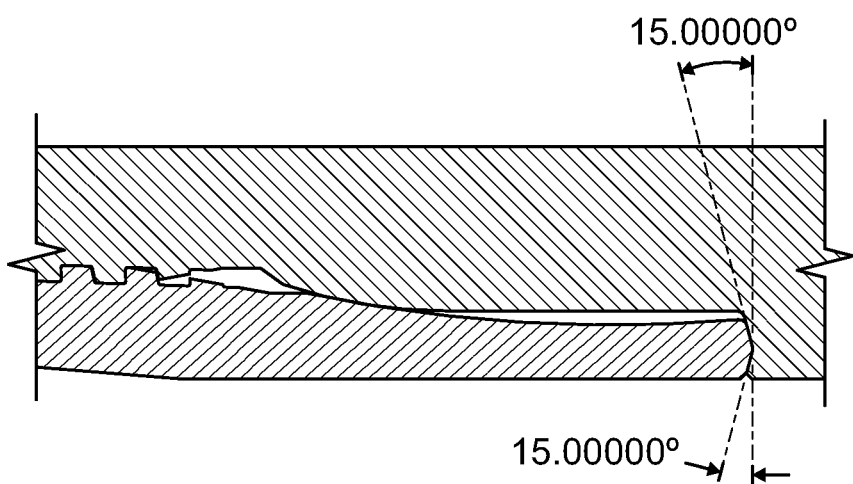
FIG. 7 shows details of the torque shoulder of the embodiment of FIGS. 1 to 6.

As shown in FIG. 7, in the embodiment of FIGS. 1 to 5, the torque shoulder is a V shape. The V torque shoulder prevents the pin from being driven upwards into the box corner by trapping it. The bottom of the V shoulder also serves the purpose of preventing externally applied pressure from forcing the pin inward and de-energizing the seal. Thus, the V shoulder serves to trap the shoulder from moving in either direction, radially inward or outward. The upper and lower portions of the V shoulder are at a 15 deg. angle to a line perpendicular to the axis of the pipe. This angle can vary considerably (maybe 5-30 degrees) and the angle does not have to be equal for both the box and pin portions. Additionally, the place where the two portions meet does not have to be in the center of the shoulder as is depicted. The lower portion could be longer and will be on many designs.

Figure 8:
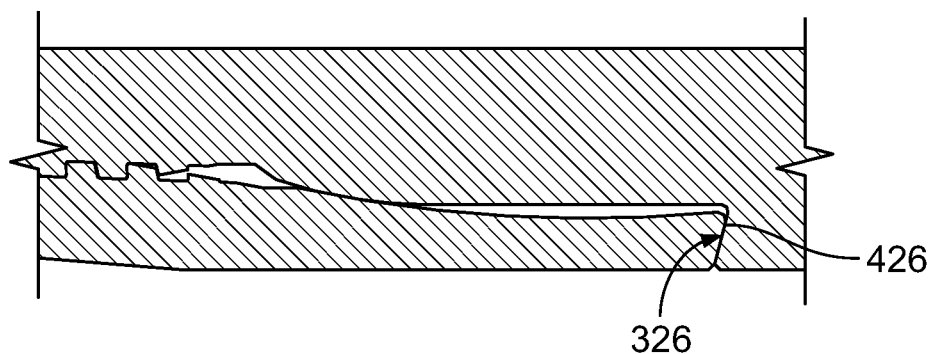
FIG. 8 shows a second embodiment of the present invention.

FIG. 8 shows a second less preferable embodiment of the present invention without the V-shaped torque shoulder, a pin torque shoulder 326 angled inwardly to contact a box torque shoulder 426.

What is claimed is:

1. A threaded connection comprising:
a first tube having a pin, the pin having pin threads, a circumferential outer pin surface, and a pin torque shoulder at a free end, the circumferential outer pin surface including a singular circumferential annular concave outer pin seal surface, the pin seal surface of the pin being axially spaced apart from the pin torque shoulder of the pin; and
a second tube having a box, the box having box threads for interacting with the pin threads, a circumferential inner box surface and a box torque shoulder, the inner box surface having a radially inwardly extending box seal surface, the pin seal surface contacts the box seal surface to define a seal, the seal being spaced from the free end when the pin and box torque shoulders contact, wherein a gap is formed between the pin and box from the seal to the pin torque shoulder, and wherein the singular outer pin seal surface is the only contact point between the circumferential outer pin surface and the circumferential inner box surface during make-up.

2. The threaded connection as recited in claim 1 wherein the box seal surface is a convex surface having a box seal radius of curvature smaller than a pin seal surface radius of curvature.

3. The threaded connection as recited in claim 1 wherein the pin seal surface extends radially inwardly toward the free end, and wherein the pin includes a continuous extension located on the pin between the pin seal surface and the pin torque shoulder, wherein the continuous extension is configured to not contact circumferential box surface during make-up of the connection.

4. The threaded connection as recited in claim 1 wherein at least one of the pin and box torque shoulder is V-shaped in cross-section.

5. The threaded connection as recited in claim 1 wherein a line tangent to a box seal surface radius and the pin seal surface radius at the point of maximum contact stress at power tight make up forms an angle of 5 to 15 degrees with a longitudinal axis of the first and second tubes.

6. The threaded connection as recited in claim 1 wherein a distance from the free end of the pin to a seal maximum stress contact point is in a range of 0.5 to 1.5 inches.

7. The threaded connection as recited in claim 6 wherein the distance from the free end of the pin to the seal maximum stress contact point is approximately 1 inch.

8. The threaded connection as recited in claim 1 wherein in a hand tight position, the pin seal surface and box seal surface touch and a standoff exists between the pin torque shoulder and the box torque shoulder.

9. The threaded connection as recited in claim 1 wherein in a shoulder tight position, the pin seal surface and box seal surface contact one another and the pin torque shoulder and the box torque shoulder contact one another and there is no standoff between the pin torque shoulder and the box torque shoulder.

10. A threaded connection comprising:
a first tube having a pin, the pin having pin threads, a circumferential outer pin surface, and a pin torque shoulder at a free end, the circumferential outer pin surface including a singular circumferential annular concave outer pin seal surface and a continuous extension provided from the pin seal surface to the pin torque shoulder; and a second tube having a box, the box having box threads for interacting with the pin threads, a circumferential inner box surface and a box torque shoulder, the inner box surface having a radially inwardly extending box seal surface, the pin seal surface contacts the box seal surface to define a seal, the seal being spaced from the free end when the pin and box torque shoulders contact, the continuous extension continuing from the seal to the pin torque shoulder;

the pin seal surface being concave and the box seal surface being convex at the seal, the continuous extension being continuous with the concave pin seal surface and extending from the concave pin seal surface to the pin torque shoulder, and wherein the singular outer pin seal surface is the only contact point between the circumferential outer pin surface and the circumferential inner box surface during make-up.

11. The threaded connection as recited in claim 10 wherein the box seal surface has a box seal radius of curvature smaller than a pin seal radius of curvature.

12. The threaded connection as recited in claim 10 wherein the pin seal surface extends radially inwardly toward the free end, and the extension is configured to not contact circumferential box surface during make-up of the connection.

13. The threaded connection as recited in claim 10 wherein at least one of the pin and box torque shoulder is V-shaped in cross-section.

14. The threaded connection as recited in claim 10 wherein the first tube is a pipe and the second tube is a connector having a second box similar to the box on a second end.

15. The threaded connection as recited in claim 10 wherein a line tangent to a box seal surface radius and the pin seal surface radius at the point of maximum contact stress at power tight make up forms an angle of 5 to 15 degrees with a longitudinal axis of the first and second tubes.

16. The threaded connection as recited in claim 10 wherein a distance from the free end of the pin to a seal maximum stress contact point is in a range of 0.5 to 1.5 inches.

17. The threaded connection as recited in claim 16 wherein the distance from the free end of the pin to the seal maximum stress contact point is approximately 1 inch.

18. The threaded connection as recited in claim 10 wherein in a hand tight position, the pin seal surface and box seal surface touch and a standoff exists between the pin torque shoulder and the box torque shoulder.

19. The threaded connection as recited in claim 10 wherein in a shoulder tight position, the pin seal surface and box seal surface contact one another and the pin torque shoulder and the box torque shoulder contact one another and there is no standoff between the pin torque shoulder and the box torque shoulder.

20. The threaded connection as recited in claim 10 wherein the continuous extension is concave.

* * * * *